(12) United States Patent
Nordstog

(10) Patent No.: US 7,861,698 B2
(45) Date of Patent: Jan. 4, 2011

(54) PROJECTILE TYPE INSECT SWATTER SUCH AS FIRED FROM A GUN

(76) Inventor: Bruce Nordstog, 38394 Beecher Dr., Sterling Heights, MI (US) 48312

( * ) Notice: Subject to any disclaimer, the term of this patent is extended or adjusted under 35 U.S.C. 154(b) by 796 days.

(21) Appl. No.: 11/735,536

(22) Filed: Apr. 16, 2007

(65) Prior Publication Data
US 2008/0035134 A1    Feb. 14, 2008

Related U.S. Application Data

(60) Provisional application No. 60/821,882, filed on Aug. 9, 2006.

(51) Int. Cl.
F41B 7/00 (2006.01)
A01M 3/00 (2006.01)
(52) U.S. Cl. ........................... 124/16; 43/135
(58) Field of Classification Search ............... 43/133, 43/134, 135, 137, 107; 124/16, 21, 20.3, 124/26, 27, 25, 67, 31, 81, 85; 446/473, 446/429, 430; 473/569, 613, 575, 576; 102/400, 102/502, 504, 501; 273/129, 317, 129 R, 273/129 S, 129 T, 129 V, 129 W; 42/54, 42/55; 89/1.34
See application file for complete search history.

(56) References Cited

U.S. PATENT DOCUMENTS

| 1,291,113 A | 1/1919 | Pewther |
| 1,304,074 A | 5/1919 | Limoges |
| 1,319,693 A | 10/1919 | Carlson |
| 1,344,943 A | 6/1920 | Graham |
| 1,356,371 A | 10/1920 | Jolly |
| 1,387,922 A | 8/1921 | Coup |
| 1,400,782 A | 12/1921 | Wallace |
| 1,457,674 A | 6/1923 | Kennedy et al. |
| 1,468,373 A | 9/1923 | Blake |
| 1,499,168 A | 6/1924 | Funk |
| 1,597,140 A | 8/1926 | Barto |
| 1,857,757 A | 5/1932 | Kirby |
| 2,093,659 A | 9/1937 | Kahler |
| 2,129,217 A | 9/1938 | Kahler |
| 2,191,126 A | 2/1940 | Gustke |
| 2,578,352 A | 12/1951 | Grunkemeyer |
| 2,616,409 A | 11/1952 | Davis |
| 3,871,125 A | 3/1975 | Wilson et al. |
| 4,132,027 A | 1/1979 | Malacheski et al. |
| 4,195,615 A | 4/1980 | Belokin |
| 4,386,478 A | 6/1983 | Belokin |
| 4,450,649 A | 5/1984 | Dunwoody |
| 4,541,402 A | 9/1985 | Winters |
| 4,631,858 A | 12/1986 | Kahle |

(Continued)

Primary Examiner—Joshua J Michener
(74) Attorney, Agent, or Firm—Gifford, Krass, Sprinkle, Anderson & Citkowski, P.C.

(57) ABSTRACT

A toy device for use in entrapping an object including a handheld implement exhibiting at least a barrel which supports a propelling mechanism and a trigger which, further upon depressing, actuates the propelling mechanism. A projectile includes a stem and a pair of mutually hingedly supported and opposingly actuation pads, the stem being supported upon the barrel and in contact with the propelling mechanism. Upon being discharged, the pads are actuated from a first position to a second rotated position, such as through the action of a lanyard extending from the handheld implement to a release plate associated with the projectile, and in order to entrap the object such as a winged insect.

13 Claims, 10 Drawing Sheets

U.S. PATENT DOCUMENTS

| | | |
|---|---|---|
| 4,774,786 A | 10/1988 | Zaremba |
| 4,817,330 A | 4/1989 | Fahringer |
| 5,207,018 A | 5/1993 | Reaver et al. |
| 5,537,777 A | 7/1996 | Geeting |
| 6,067,746 A | 5/2000 | Kistner et al. |
| 6,276,085 B1 | 8/2001 | Wooten et al. |
| 6,279,262 B1 | 8/2001 | Walkemeyer |
| 6,574,915 B1 | 6/2003 | Allen |
| 6,655,370 B1 * | 12/2003 | Beckwith .................... 124/16 |
| 6,851,218 B1 | 2/2005 | Conte |
| D527,774 S | 9/2006 | Belokin et al. |

\* cited by examiner

Fig. 2.1

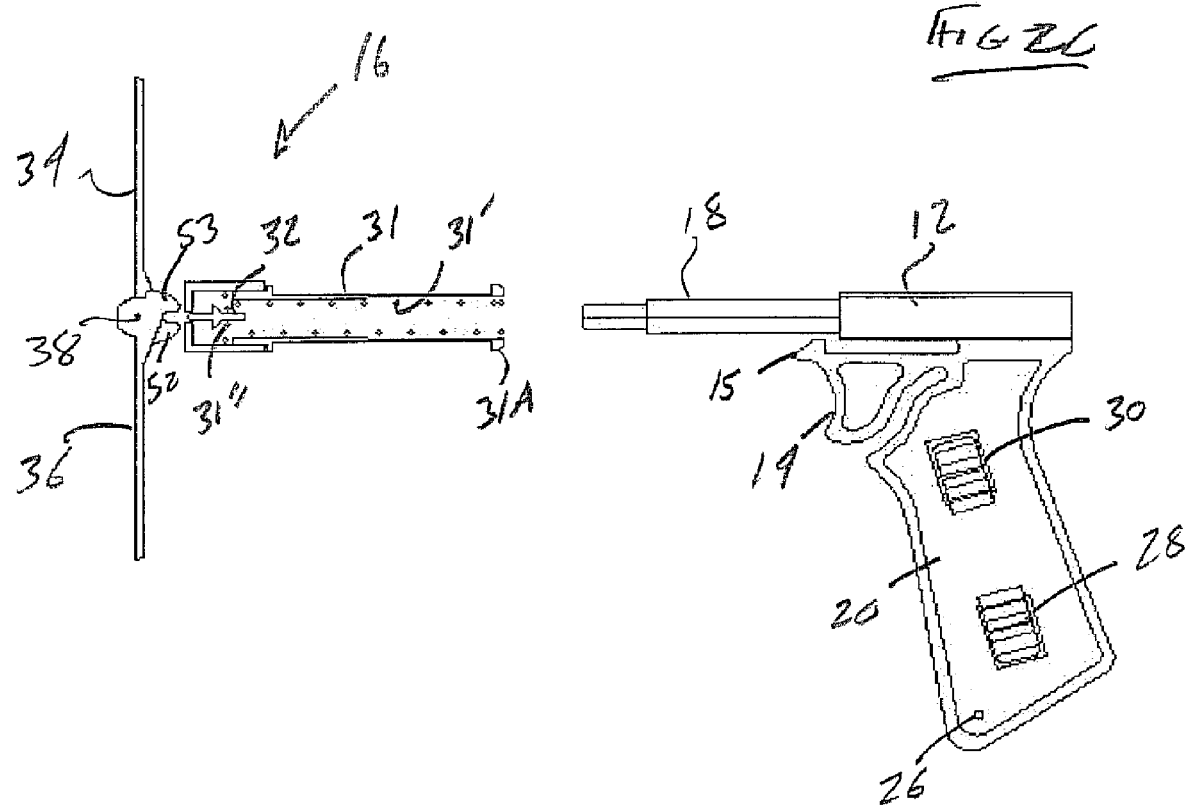

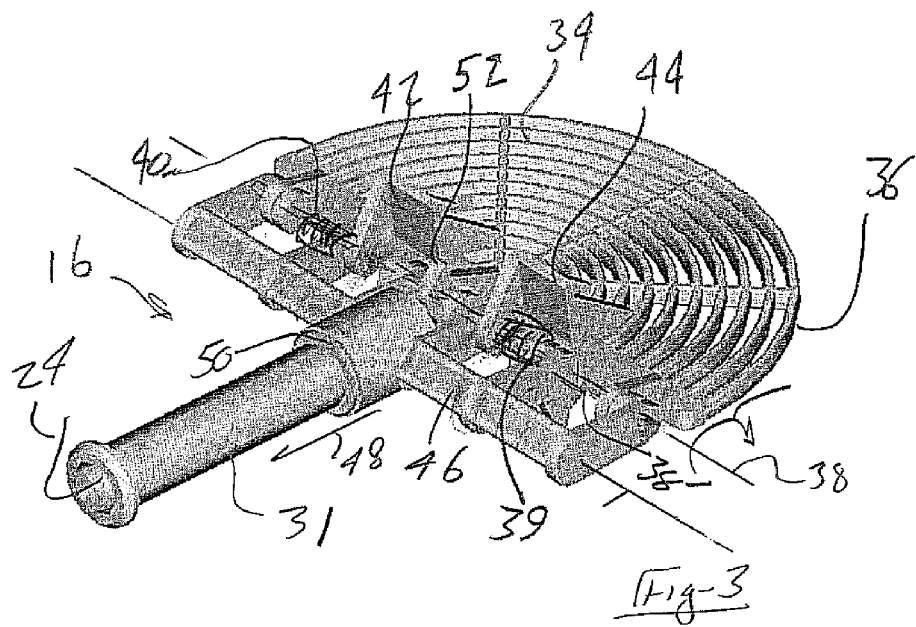
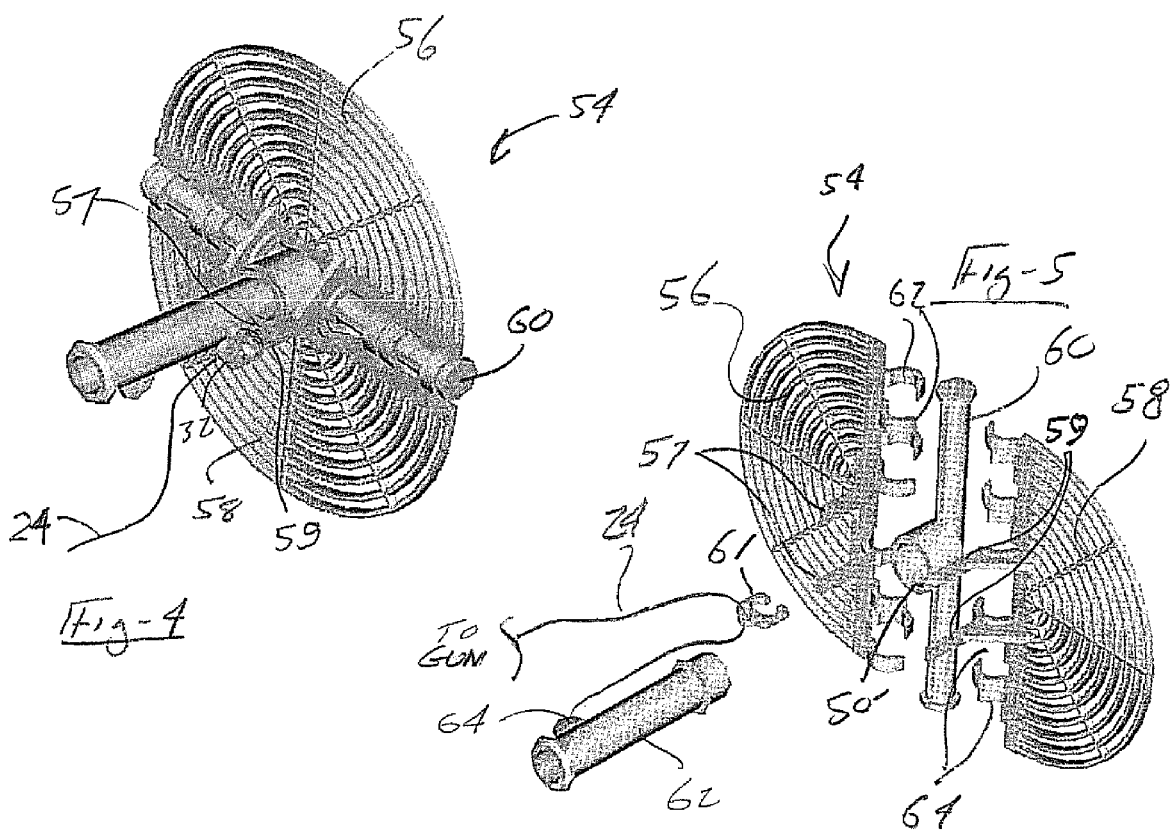

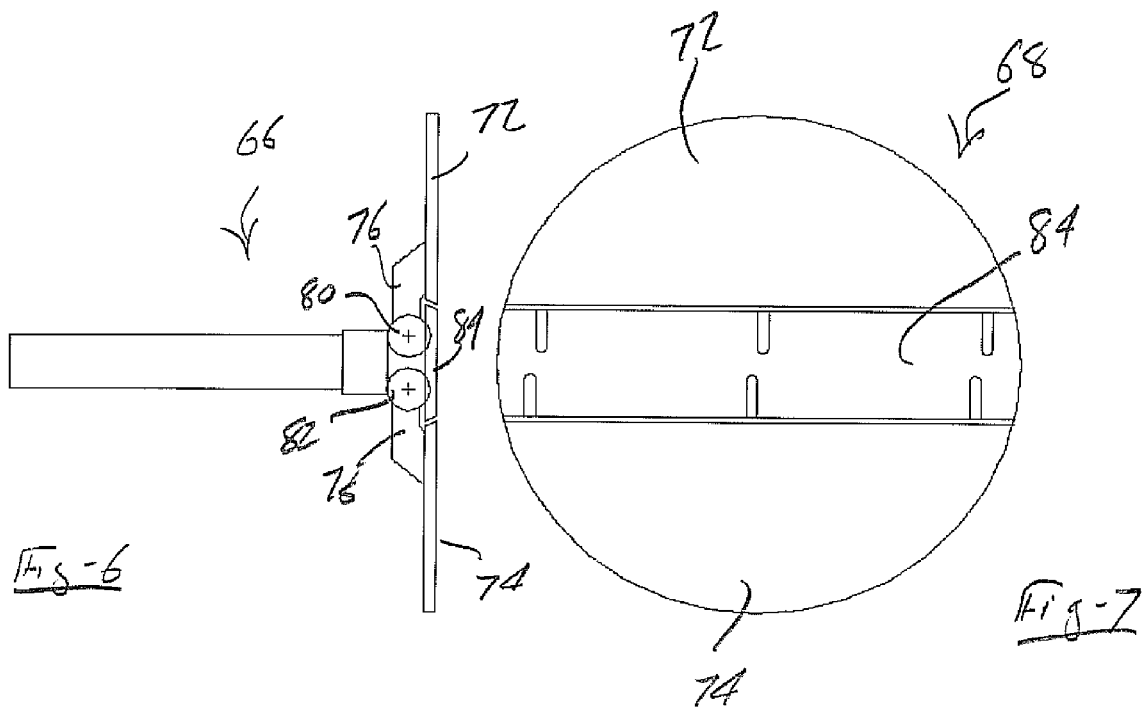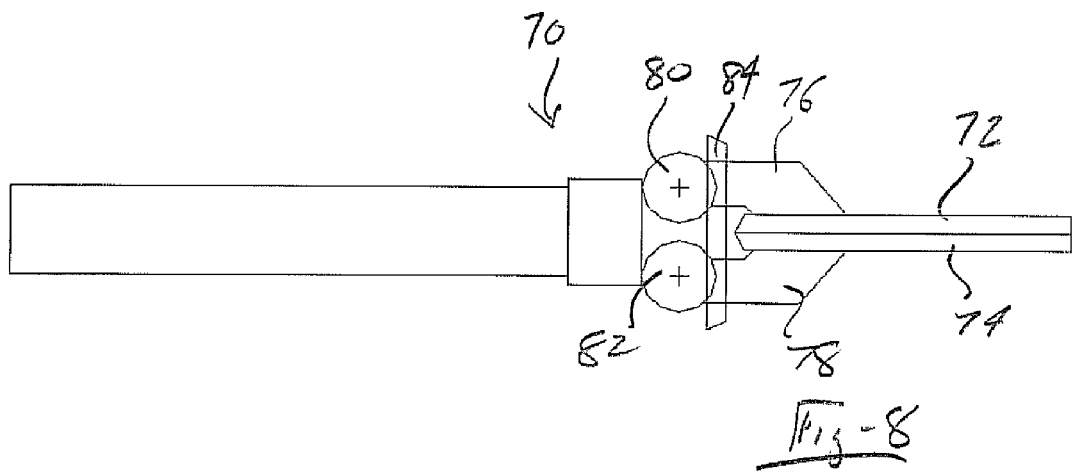

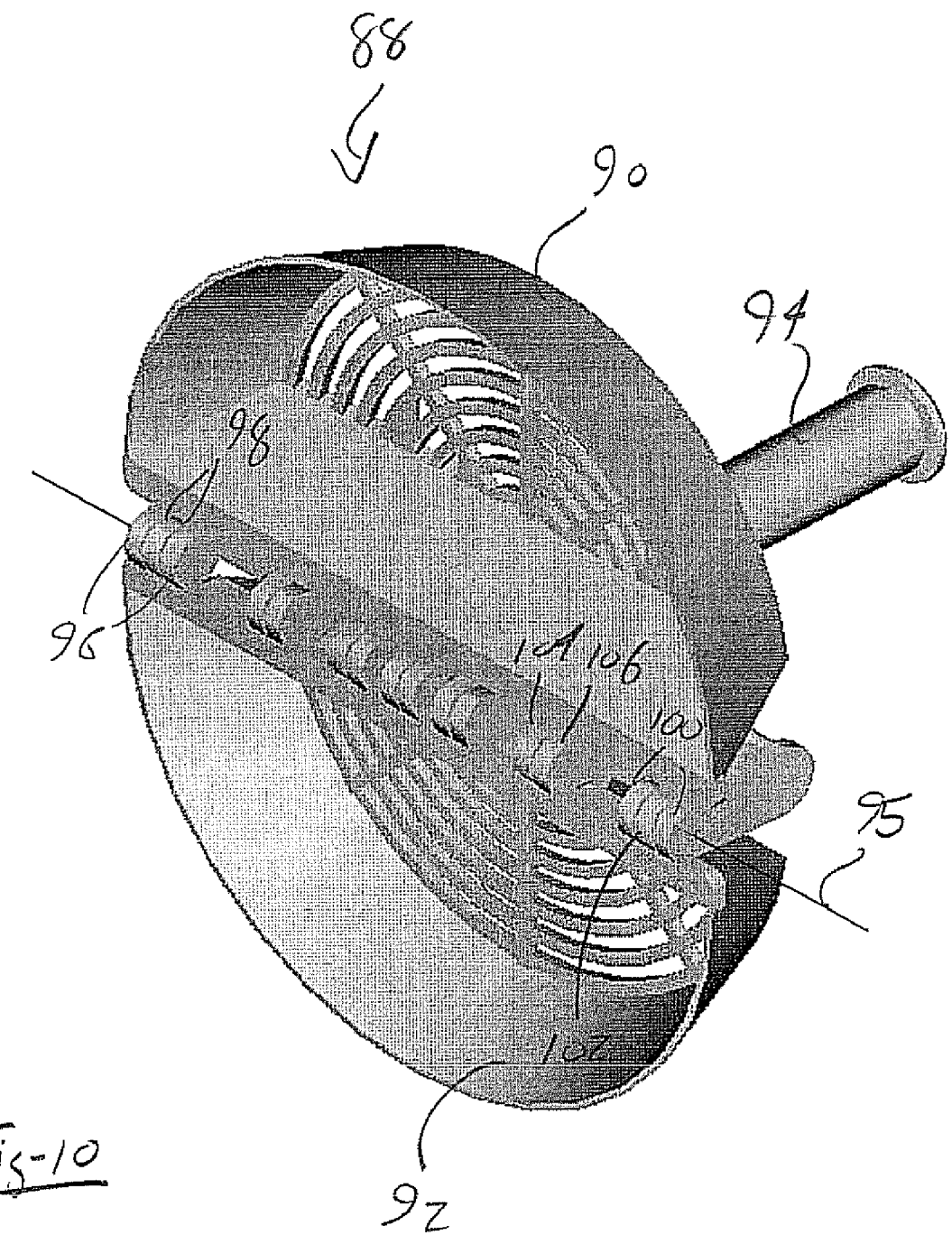

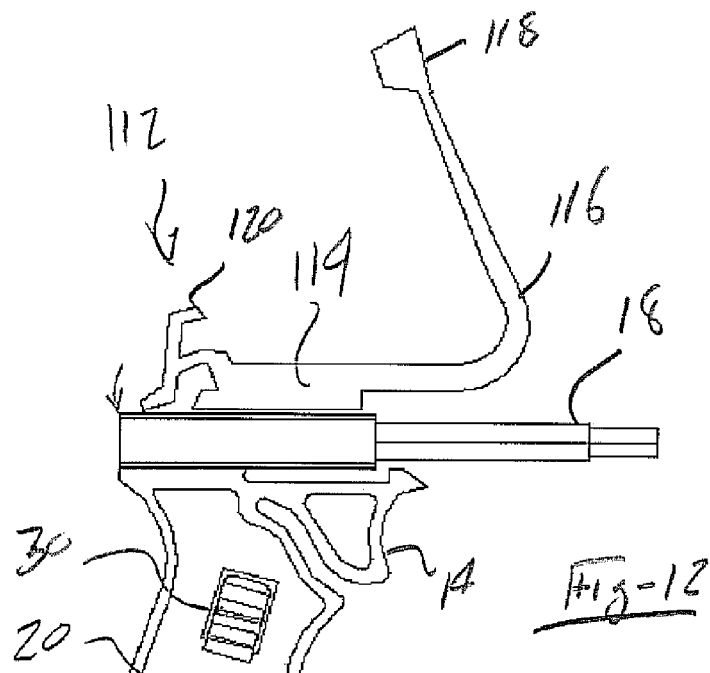
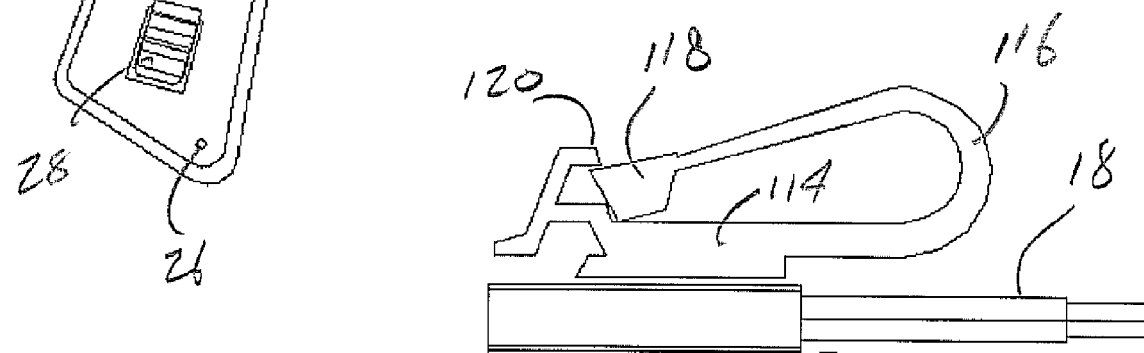
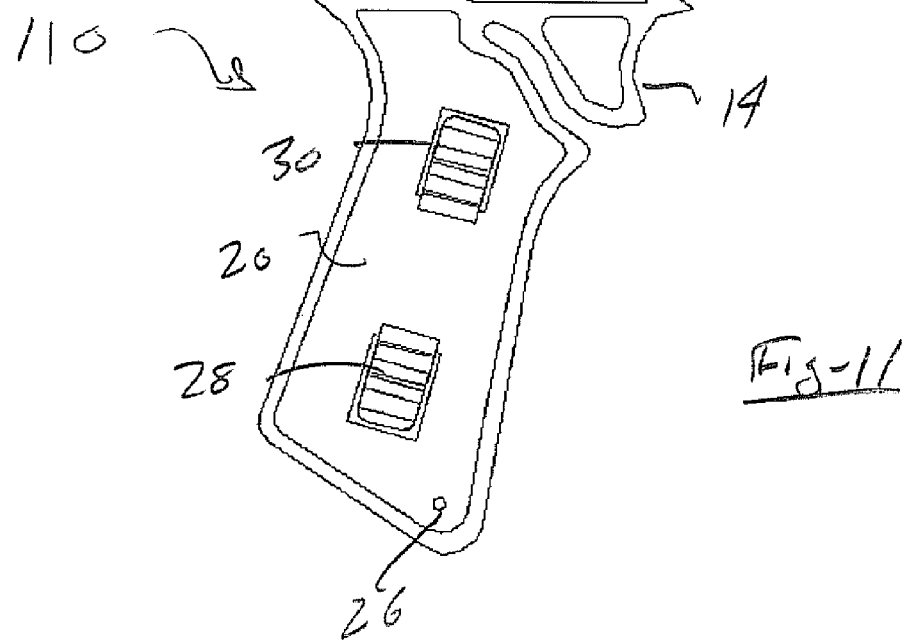

PROJECTILE TYPE INSECT SWATTER SUCH AS FIRED FROM A GUN

CROSS-REFERENCE TO RELATED APPLICATIONS

The present application claims the priority of U.S. Provisional Patent Application Ser. No. 60/821,882, filed Aug. 9, 2006, for Projectile Type Insect Swatter Such as Fired From a Gun.

FIELD OF THE INVENTION

The present invention relates generally to a projectile type insect swatter device, such as which is fired in spring-loaded fashion from a handheld pistol or other mock up firearm. The projectile type swatter is an improvement over prior art designs in that it provides a farther clamshell actuating mechanism for closing first and second pad supports associated with the projectile, and in order to provide enhanced insect compression/capture features.

DESCRIPTION OF THE PRIOR ART

The prior art is documented with examples of toy pistol and other devices. In particular, such devices are known for firing a projectile of some sort, particularly for the purpose of impacting/eliminating insects.

A first example selected from the prior art is illustrated in U.S. Pat. No. 4,386,478, issued to Belokin, and which teaches a retrievable and self-contained power projectile including a flexible and shallow, cone-shaped disc at its front end to kill flies, insects and the like. A tubular member carries a spring which powers the projectile. The disc is formed by a series of concentric spaded apart rings held in the cone shape by a series of tapered ribs at the rear side of the disc, all being formed integrally of a relatively soft plastic such a polypropylene.

Related U.S. Pat. No. 4,195,615, also to Belokin, also discloses a projectile portion which incorporates its own spring, and in order to power the projectile. The gun is formed of plastic and has an integral trigger including a catch which holds the projectile in a cocked position.

A second group of prior references teach projectile fired devices of similar nature, typically spring loaded and with annular enlarged striking faces. Reference is made specifically to U.S. Patents to Blake, U.S. Pat. No. 1,468,373, to Davis, U.S. Pat. No. 7,616,409, to Kahler, U.S. Pat. No. 2,129,217, to Kirkby U.S. Pat. No. 1,857,757, to Grunkemeyer, U.S. Pat. No. 2,578,352, to Funk, U.S. Pat. No. 1,499,168, to Winters, U.S. Pat. No. 4,541,402 and to Carlson, U.S. Pat. No. 1,319,693.

Yet additional references teach insect trapping devices, including linkage connected and foldable first and second halves, none of these otherwise being associated with any type of handheld projectile firing device. Such references are set forth in U.S. Pat. No. 6,067,746, to Kistner, to Gustke, U.S. Pat. No. 9,191,126, and to Walkemeyer, U.S. Pat. No. 6,279,262.

SUMMARY OF THE INVENTION

The present invention discloses a toy device for use in entrapping an object including a handheld implement exhibiting at least a barrel which supports a propelling mechanism. In a preferred variant, the projectile is provides as a depressible coil spring and a trigger is provided which, further upon depressing, actuates the propelling mechanism/spring.

A projectile includes a stem and a pair of mutually hingedly supported and opposingly actuation pads, the stem being supported upon the barrel and in contact with the propelling mechanism spring. Upon actuating the trigger and discharging the projectile, the pads are actuated from a first position to a second rotated position, such as through the action of a lanyard extending from the handheld implement to a release plate associated with the projectile, and in order to entrap the object such as a winged insect.

Additional variants contemplate the pads exhibiting a three-dimensional caged or otherwise configured appearance. Other variants also include a pair of rear side located and angled support arms which interconnect rear locations of the pads, through the use of a pair of rotating hinges. A central and fixed shield location operates in combination with the engagement of the pads, upon the initiating activation of one or more springs and in order to facilitate the rotation of the pads to the closed abutting position.

According to another decorative sub-design variant of projectile, a plurality of teeth are associated with respective and hingedly supported pads, these further passing through opposing and aligning holes and, in this fashion, to permit the pads to actuate to a completely closed position. A yet further variant teaches a secondary catapult mechanism supported upon a top surface of the pistol barrel and including an affixed base from which extends an elongated and biased/deflectable neck. The elongated neck is reverse bent in a substantially hairpin style and terminates at a remote end in a bucket support portion, the same being restrained by an opposing and overlapping edge of a likewise deflectable catch portion. A small object, such as a foam ball, pebble or other such object (not shown) can be supported within the bucket portion and upon a user deflecting the catch portion rearwardly (such as through the motion of the thumb) causes the catapult launcher to be actuated to propel the bucket supported object as a secondary novel feature, and such as in addition to the normal actuation of the lanyard supported projectile (not shown in this illustration).

BRIEF DESCRIPTION OF THE DRAWINGS

Reference will now be made to the attached drawings, when read in combination with the following detailed description, wherein like reference numerals refer to like parts throughout the several views, and in which:

FIG. 2C is a successive illustration to that shown in FIG. 2B and by which the release plate is moved to the retracted position and the pads permitted to rotate to the closed position;

FIG. 2.1 is a view of a release plate associated with the swatter assembly of FIG. 2.

FIG. 3 is an enlarged sectional perspective of a selected pad component associated with the projectile according to the embodiment of FIG. 1;

FIG. 4 is a sectional perspective of an alternately configured projectile component according to a further preferred embodiment;

FIG. 5 is an exploded view of the projectile illustrated in FIG. 4;

FIG. 6 is a plan view of a yet further projectile component according to still another preferred variant of the present invention;

FIG. 7 is a front view of the projectile illustrated in FIG. 6;

FIG. 8 is an actuated plan view of the projectile of FIG. 6;

FIG. 10 is a rotated perspective of the projectile illustrated in FIG. 9;

FIG. 11 is a plan view of a catapult-type hand-held projectile device according to a still further variant;

FIG. 12 is a succeeding view to that shown in FIG. 11 and illustrating the catapult portion in a released/actuated position;

DETAILED DESCRIPTION OF THE PREFERRED EMBODIMENTS

Figure 1:
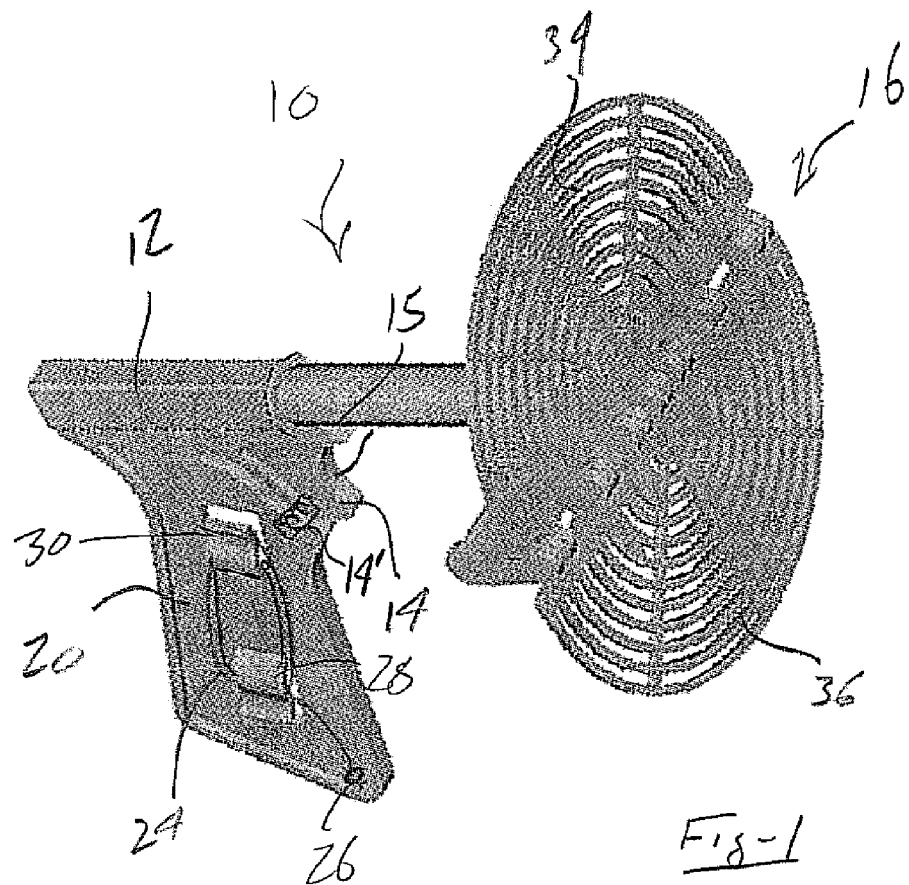
FIG. 1 is a perspective view of a swatter assembly according to a first preferred variant of the present inventions.
Figure 2:
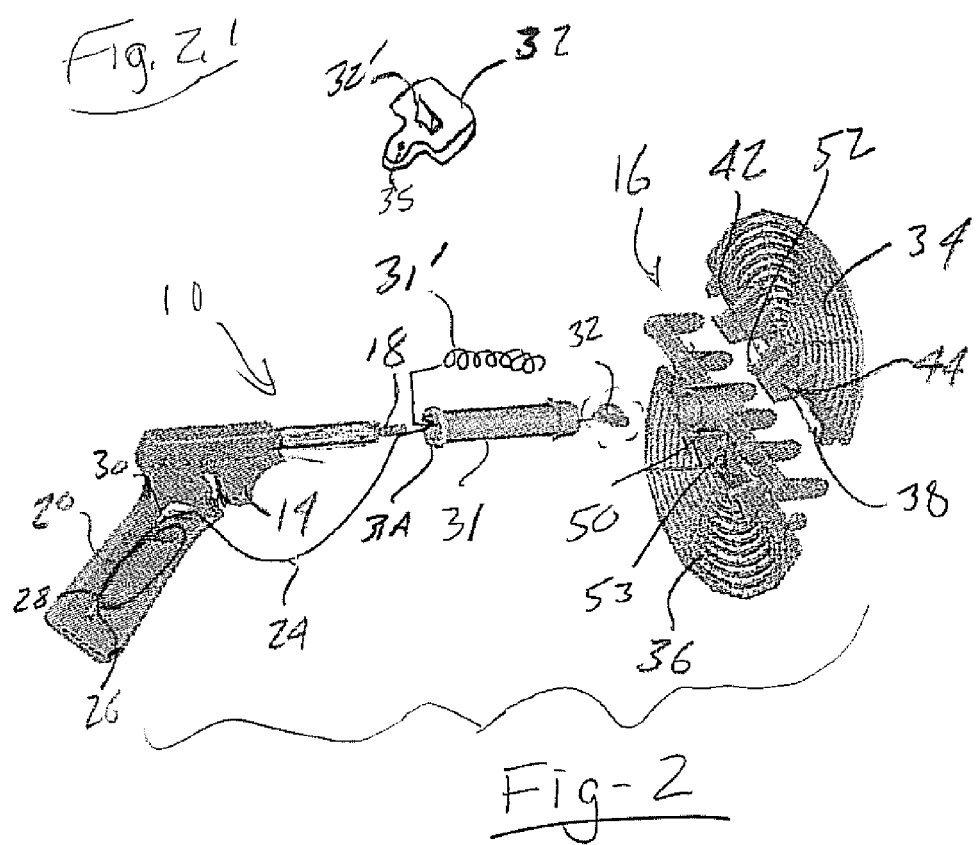
FIG. 2 is an exploded view of the swatter assembly shown in FIG. 1.

Referring now to FIGS. 1 and 2, perspective and exploded views are shown respectively, at 10 of a projectile type swatter assembly according to a first variant of the present inventions. The swatter assembly, as will be described in additional detail throughout the several embodiments illustrated, is an improvement over prior art designs in particular in that it provides an improved projectile firing portion incorporating a pair of clamshell and biasing/displaceable pad supports to further assist in enhanced compression and capture of either an airborne or surface located insect (e.g. fly, mosquito, etc.).

As is additionally described with reference to FIG. 3 in addition to FIGS. 1 and 2, the main features of the assembly include a hand held gun 12 exhibiting a trigger 14 for firing a projectile 16 (see again FIG. 3) from a barrel 18 of the gun 12 (see further FIG. 2). As best shown in FIG. 1, an angled catch or tab portion 15 associated with the trigger 14 is provided and which may incorporate the requisite linkage construction in order to engage and actuate a propelling mechanism such as a spring or the like, as will be further described. Although shown as a hand-held pistol, it is understood that the gun may also include such as a rifle, crossbow design or any modification thereof and typically is constructed of wood, metal, plastic or any combination of materials.

A handle or stock 20 includes trigger mechanism 14, this usually consisting of spring or other biasing element as will be further described and which provides the energy to propel the projectile 16. The trigger mechanism 14, would typically include a biasing element (see at 14' in FIG. 1) which is cocked into a compressed position and, upon being depressed, (as will be further described in reference to FIGS. 2A-2C) in turn actuates the associated tab portion 15 to separate from an inner collar abutment associated with the projectile (as will be further described) and which causes the projectile 16 to be forcibly ejected. Reference is also made to a similar arrangement disclosed in U.S. Pat. No. 4,195,615 to Belokin, in particular FIG. 1 and column 2, lines 38-50.

Also illustrated is a lanyard or other suitable string/cord 24, this attaching at a first end 26 to the gun 12 and winding a selected turns about a pair of winder support portions 28 and 30 defined upon the handle 20, so as to adjust an overall travel length of the projectile 16. As will be further described, a second remote end of the string connects to a release plate portion located within an interior collar portion of the projectile associated with the projectile 16. Upon actuating the trigger 14 and discharging the projectile 16, the length of unwound lanyard 24 extending from the handle defines an overall travel length of the projectile when fired from the gun 12, as well as a point of actuation of relatively displaceable pads associated with the projectile component, and can be length adjustable, such as winding or unwinding from the stock of the gun.

The projectile 16 again includes a collar 31 which slidingly engages over the projecting barrel 18 of the hand-held device as shown in FIG. 2 and includes a first annular enlarged end, at 31A, and which when in its cocked position engages the catch or tab portion 15. As further referenced in the exploded view of FIG. 2.1, a release plate 32 is secured within a forward end of the projectile component 16 and to which a forward end of the lanyard 24 is secured. The release plate 32 (as best shown in FIG. 2.1) exhibits first and second faces, from which extend in opposite fashion, catch tangs 32' As best shown in the cutaway views of FIGS. 2A-2C, a spring 31' is maintained inside the collar 31, a front-most portion (see at 31" in FIGS. 2B and 2Ca) of which engages and forwardly biases the release plate 32 in order to hold it in a forward biased fashion (via tabs 32') until displaced by the lanyard 24.

A pair of pads 34 and 36 are provided and are hingedly connected along a common axis 38 (see again FIG. 3) to a forward end of the collar 31. Although not clearly shown, a metal shaft 38' (in phantom in FIG. 3) is located in crosswise extending fashion along the axis 38. The pads 34 and 36 each typically exhibit a semi-circular grill shape (this providing the combined features of significant impact area, combined with reduced air disturbance during rotation to the closed position) and such that, upon actuated by a rearward retraction of the release plate 32, are caused to spring bias closed in a manner referenced by the pads 34 and 36 in FIG. 3. This is further assisted through the use of coil springs or like components, see for example as representatively shown at 39 and 40 in FIG. 3 supported about the axis defined metal shaft 38' and in parallel spaced fashion from a rearwardly spaced and parallel extending stem support 46, and further such that the ends of the springs 39 and 40 may be designed to engage and bias against support locations 42 and 44 associated with pad 34 (see again FIGS. 2 and 3) associated with a forward crosswise extending portion of the projectile associated with the hinged location 38 for the pads 34 and 36 and which is a parallel spaced distance from the rear stem support 46. Specifically, spring 39 would engage the pads at support locations 44 and the opposing support location on pad 36. Likewise, spring 40 would engage the pads at 42 and the opposing location on pad 36.

Figure 2A:
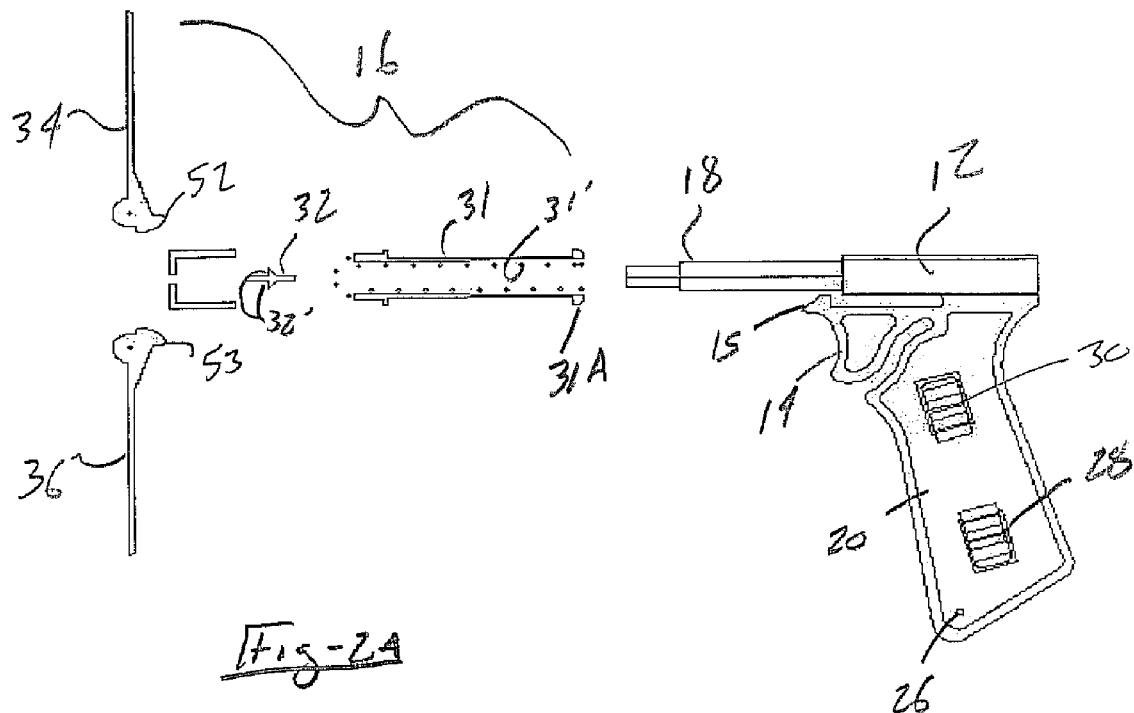
FIG. 2A is a complementary plan cutaway and exploded view of the parts manifest associated with the swatter assembly shown in FIG. 2.
Figure 2B:
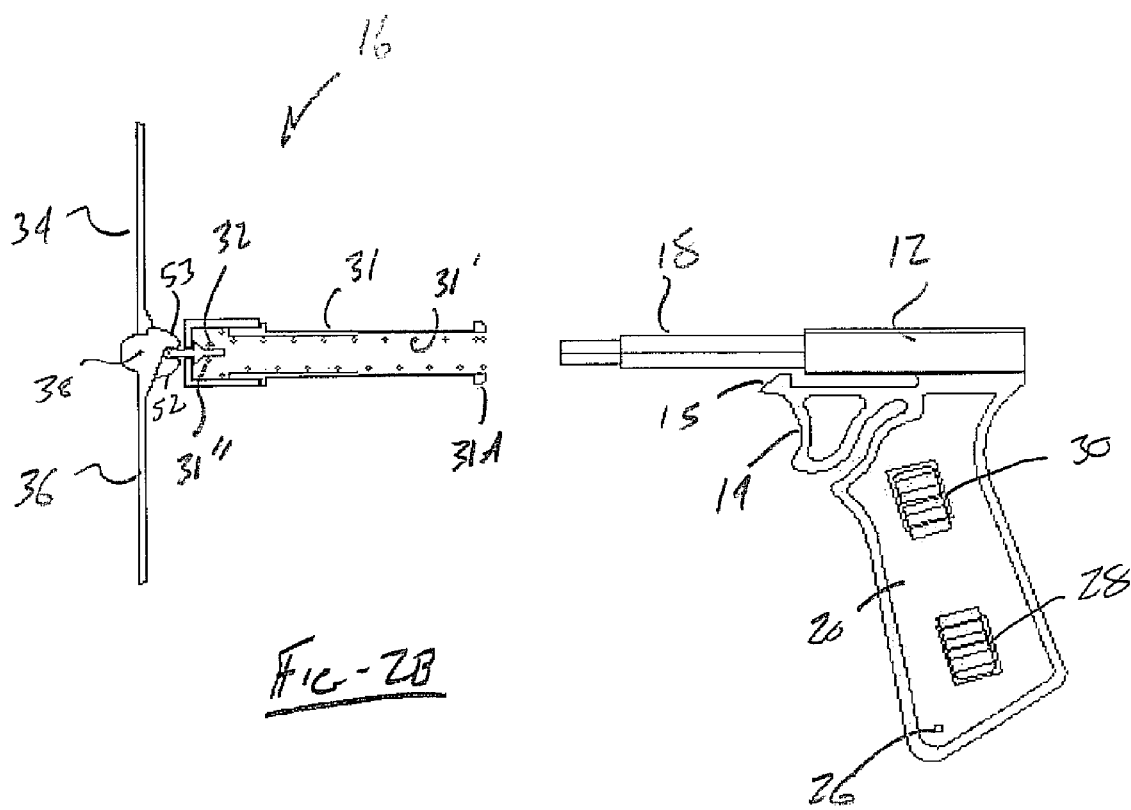
FIG. 2B is a successive view plan cutaway view illustrating in particular the projectile contained release plate held in a forward position by the associated coil spring and prior to the lanyard displacing the plate to thereby release the rotatable pads.

Referring again to FIG. 2 in cooperation with FIG. 2.1 and FIG. 3, the lanyard 24 is again attached from the gun base to the release plate 32 in interior extending fashion through the collar 31. Upon firing the projectile 16, and incurring a string tension resulting from the projectile traveling its substantially entire travel distance, the release plate is retracted linearly in a direction 48 referenced in FIG. 3. The release plate 32 (again FIG. 2.1) is previously retained in a forward most end location of a communicating central sleeve 50. At this location, a pair of catch portions (see for example that shown at 52 and 53 for pads 34 and 36 as best shown in FIGS. 2A-2C) are arranged in overlapping and mutually offset fashion and, by virtue of the forward engagement of the release plate 32 in combination with the opposing spring bias exerted against both of the pads, maintains the pads 34 and 36 in their cocked and non-actuated positions.

Upon the tensioning of the lanyard 24, the release plate 32 is retracted the incremental and lineal distance, resulting in disengagement from the opposing catch portions associated with the pads 34 and 36, and thereby resulting in the pads actuating to the closed (and presumably entrapping position) about the insect or other object located previously forward and proximate to the pads. As further best shown in the enlarged partial illustration of the release plate 32 in FIG. 2.1, additional features of the same again include a pair of opposing surface supported release tangs, again at 32', combined with a lanyard engagement location 35.

Referring again to FIGS. 2A-2C, an explanation will be made of the manner in which the projectile 16 is fired from the gun 12 and the pads 34 and 36 actuated to the closed position. In particular, FIG. 2A illustrates in plan cutaway and exploded view of the parts manifest associated with the swatter assembly shown in FIG. 2. FIG. 2B is a successive plan view cutaway illustrating, in particular, the projectile contained release plate 32 held in a forward position by the associated coil spring, see forward location 31" of spring 31', and prior to the lanyard 24 displacing the plate 32 to thereby release the rotatable pads 34 and 36. Finally, FIG. 2C is a successive illustration to that shown in FIG. 2B and by which the release plate 32 is moved to the retracted position and the pads 34 and 36 permitted to rotate to the closed position.

In this fashion, the tangs 33 associated with the release plate 32 serve to hold the plate in a specific position. When opening the pads 34 and 36 from the closed position, the cam action of the catch portions 52 and 53 act to force the release plate 32 down into the communicating central sleeve 50. Upon the pads 34 and 36 further having been rotated to the fully opened position, the spring 31' will force the release plate 32 forward, automatically locking the pads 34 and 36 in the open position.

FIGS. 4 and 5 are sectional and exploded perspectives, respectively, of an alternately configured projectile component 54 according to a further preferred embodiment. The projectile 54 is operative in use with the pistol arrangement 10 in the same manner as previously described in reference to the projectile 16, with the primary difference that associated and identically configured pads 56 and 58 and associated shaft 60 assemble together and do not require a separate metal or other shaft component (see again contrasting arrangement of forward hinged 38 and rearward spaced stem 46 in FIG. 3). Also, at least one spring element (not shown in FIGS. 4 and 5 but understood to generally replicate that shown at 39 and 40 in FIG. 3) is again provided to actuate the pads 56 and 58 to the closed position.

In this configuration, the string/lanyard 24 connects the gun base/handle 20, a variation of a release clip, see at 61, as well as an associated collar portion, see at 62 and which also exhibits further lanyard engagement location 64, see as best shown in FIG. 5. The release clip further engages one of respective first and second pairs of overlapping locations 57 and 59, respectively, associated with the pads 56 and 58 in order to hold them in the open position until string tension disengages the clip, thereby releasing allowing the pads to rotate closed. As further best shown in the exploded view of FIG. 5, an alternately configured sleeve 50' is integrally formed with a central location of the shaft 60, the pads 56 and 58 in turn including respective pluralities of arcuate gripping locations, see at 62 and 64 for pads 56 and 58, respectively, and in order to secure the same about the crosswise extending shaft 60.

FIGS. 6-8 illustrate a succession of side plan (open) 66, rotated front 68 and actuated closed 70 views, respectively, of a yet further projectile component according to still another preferred variant of the present invention. The alternate projectile design of FIGS. 6-8 includes pads 72 and 74, these including such as a smooth, flat and/or sticky/tactile covering surfaces, again in a substantially semi-circular shape each and which are hinged to clamshell together when triggered in midair. It is also again understood that the pads 72 and 74 may alternatively exhibit such as a perforated or grill type design (as referenced with pads 34 and 36 in the embodiment of FIG. 1), and in addition to other design possibilities.

As further shown, a pair of rear side located and angled support arms 76 and 78 interconnect rear locations of the pads 72 and 74, respectively, to a pair of rotating hinges 80 and 82. A central and fixed shield location 84 operates in combination with the engagement of the pads 72 and 74, upon the initiating activation of one or more springs (not shown in this view) and in order to facilitate the rotation of the pads to the closed abutting position. In this manner, the embodiment shown enables the entrapment and crushing of an insect on a flat surface, while maintaining the ability to tap insects in mid-air.

Figure 9:
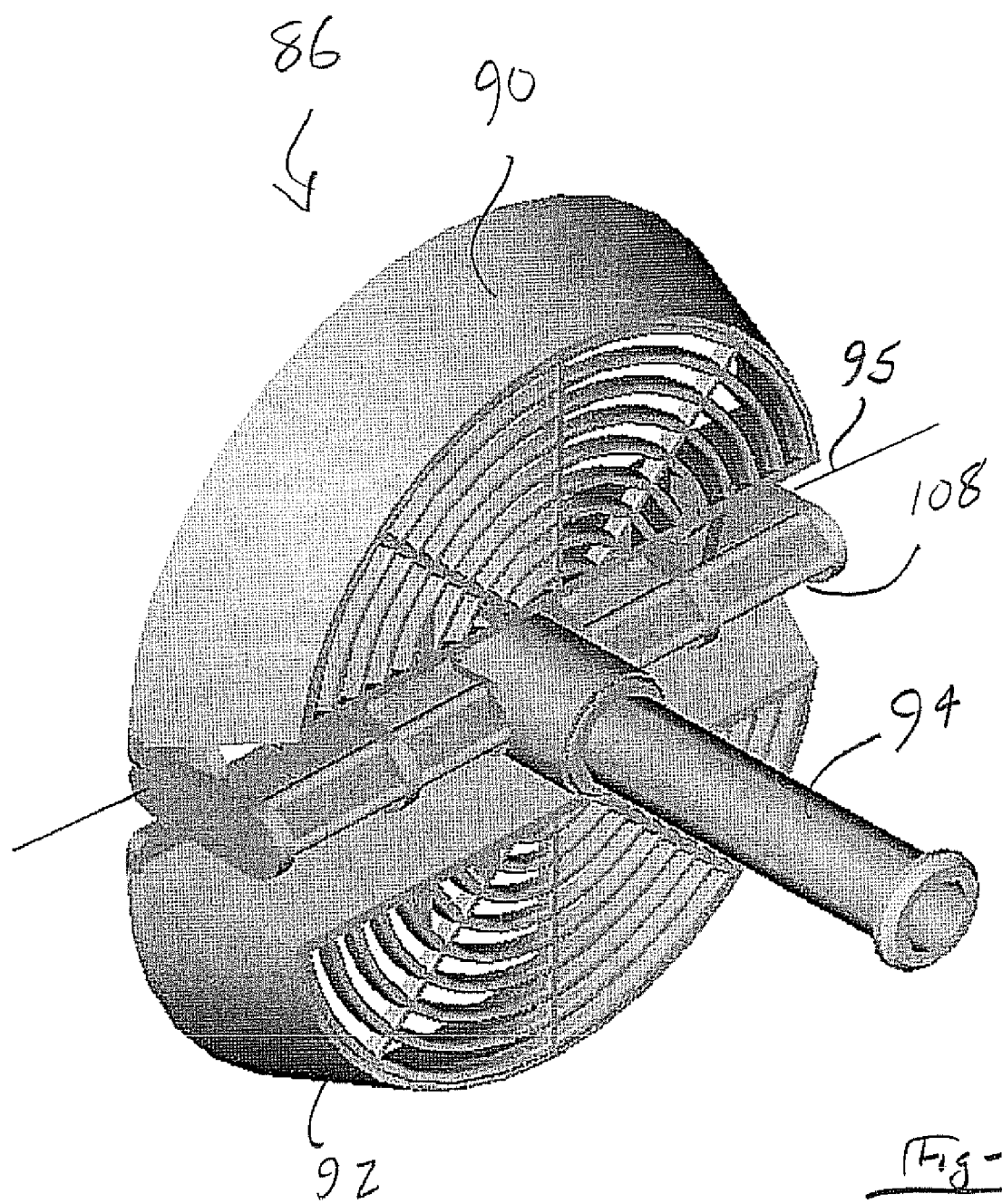
FIG. 9 is a sectional perspective of a projectile component according to a still further three dimensional enclosing cage variant of the present invention.

FIGS. 9 and 10 illustrate respective sectional perspective, at 86, and rotated perspective, further at 88, view of a projectile component according to a still further three dimensional enclosing cage variant of the present inventions. As with the previously described alternate projectile variants, the cage variant of FIGS. 9 and 10 is likewise capable of being utilized with a hand-held projectile firing device such as according to any of the type previously described.

First and second three dimensional and substantially semi-circular bowl shaped pads are referenced at 90 and 92, and which are hingedly attached to stem support 108 and in turn, is connected to a lengthwise extending collar support 94. The pads 90 and 92 can include grill-shaped bases, similar to variants previously described, and are rotatably connected about a common cross wise extending axis 95 via a number of inter-engaging hinge locations, see at 96 & 98, 100 & 102, 104 & 106, et. seq., see as shown in FIG. 10.

A rearwardly displaced and parallel extending stem support 108 identified above (see FIG. 9) is located relative to the hinge support 95 and operates along the similar principles described in reference to the projectile embodiment 16 of FIG. 1, the feature of the biasing coil spring again not being shown, as well as of the actuating release plate being hidden from view. Also not being shown is the string which is attached from the gun base and to the release plate via the inside of the collar 94.

FIGS. 11 and 12 are respective plan view illustrations of a modified, catapult-type hand-held projectile device, see at 110 and 112, according to a still further variant. The pistol type device is substantially the same as referenced in the primary embodiment of FIG. 1, and includes the common features of the handle 20, trigger 14, and spring supporting and discharge barrel 18.

Additional to FIGS. 11 and 12 are the features of a secondary catapult mechanism, this being supported upon a top surface of the pistol barrel 18 and including an affixed base 114, from which extends an elongated and biased/deflectable neck 116. The elongated neck is reverse bent in a substantially hairpin style and terminates at a remote end in a bucket support portion 118, the same being restrained by an opposing and overlapping edge of a likewise deflectable catch portion 120. A small object, such as a foam ball, pebble or other such object (not shown) can be supported within the bucket portion 118, once the same is cocked in the manner illustrated in FIG. 11 and, further upon a user deflecting the catch portion 120 rearwardly (such as through the motion of the thumb) causes the catapult launcher to be actuated to propel the bucket supported object as a secondary novel feature, and such as in addition to the normal actuation of the lanyard supported projectile (not shown in this illustration).

Figure 13:
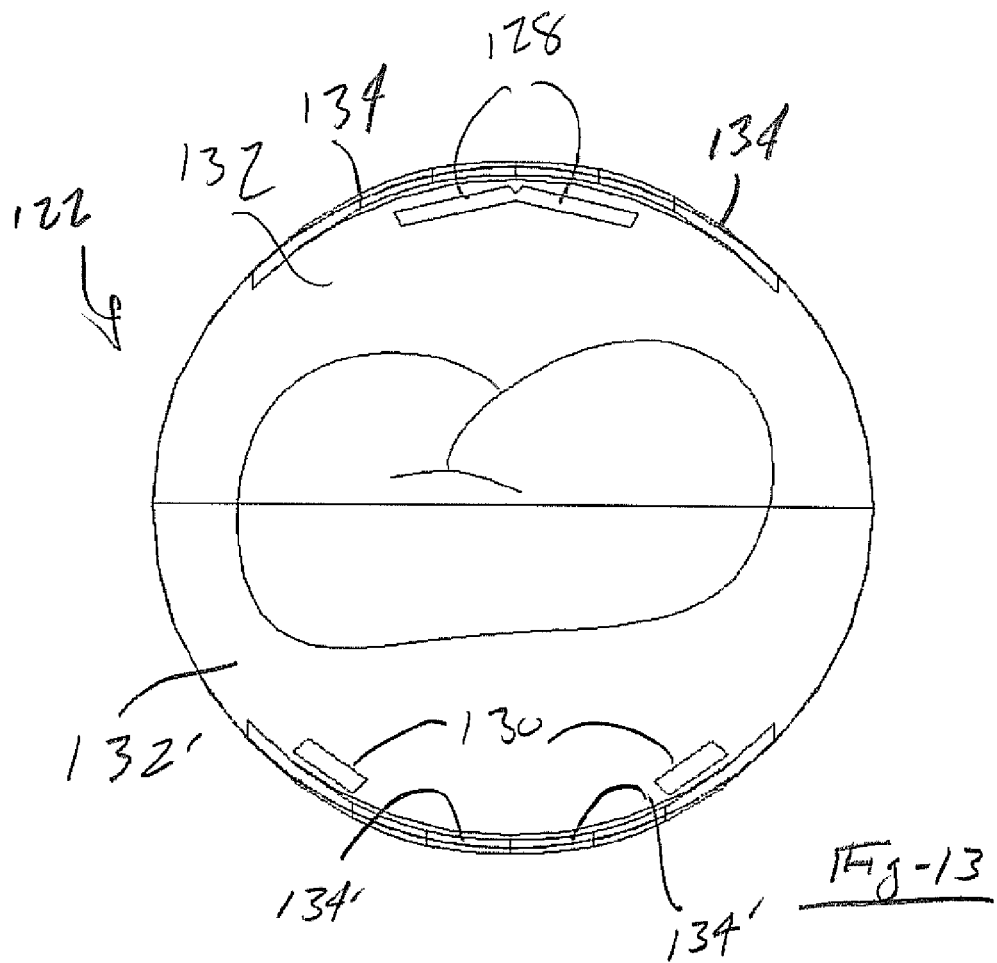
FIG. 13 is a front plan view of a projectile component according to a yet further preferred variant of the present invention.
Figure 14:
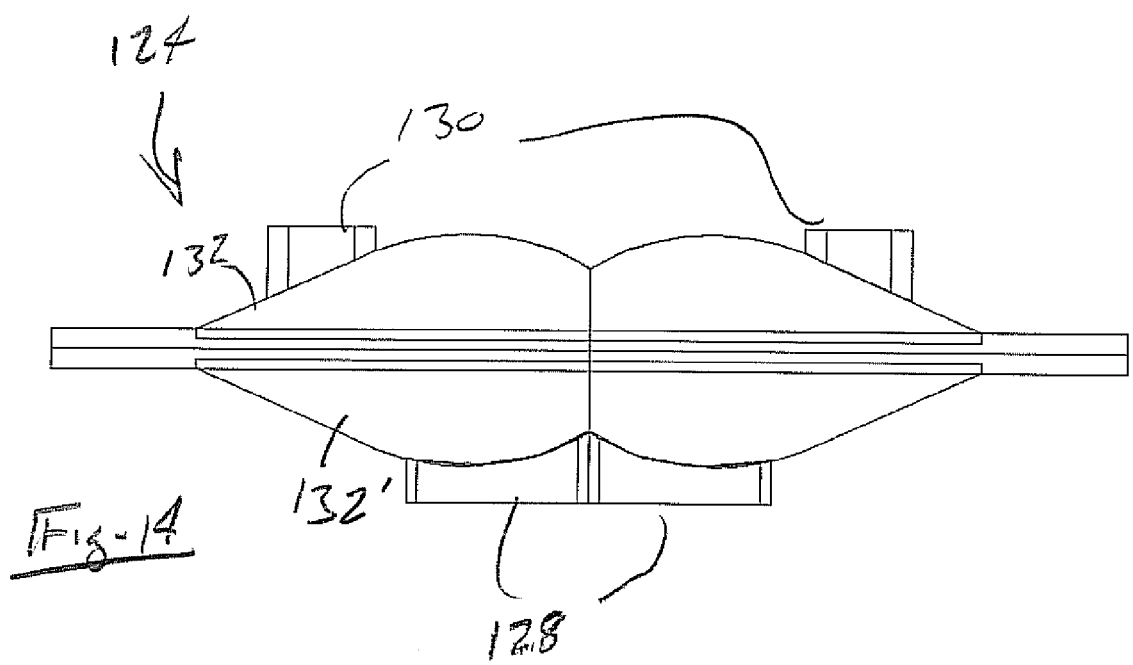
FIG. 14 is a succeeding front plan view of the projectile component in an actuated and closed pad condition.
Figure 15:
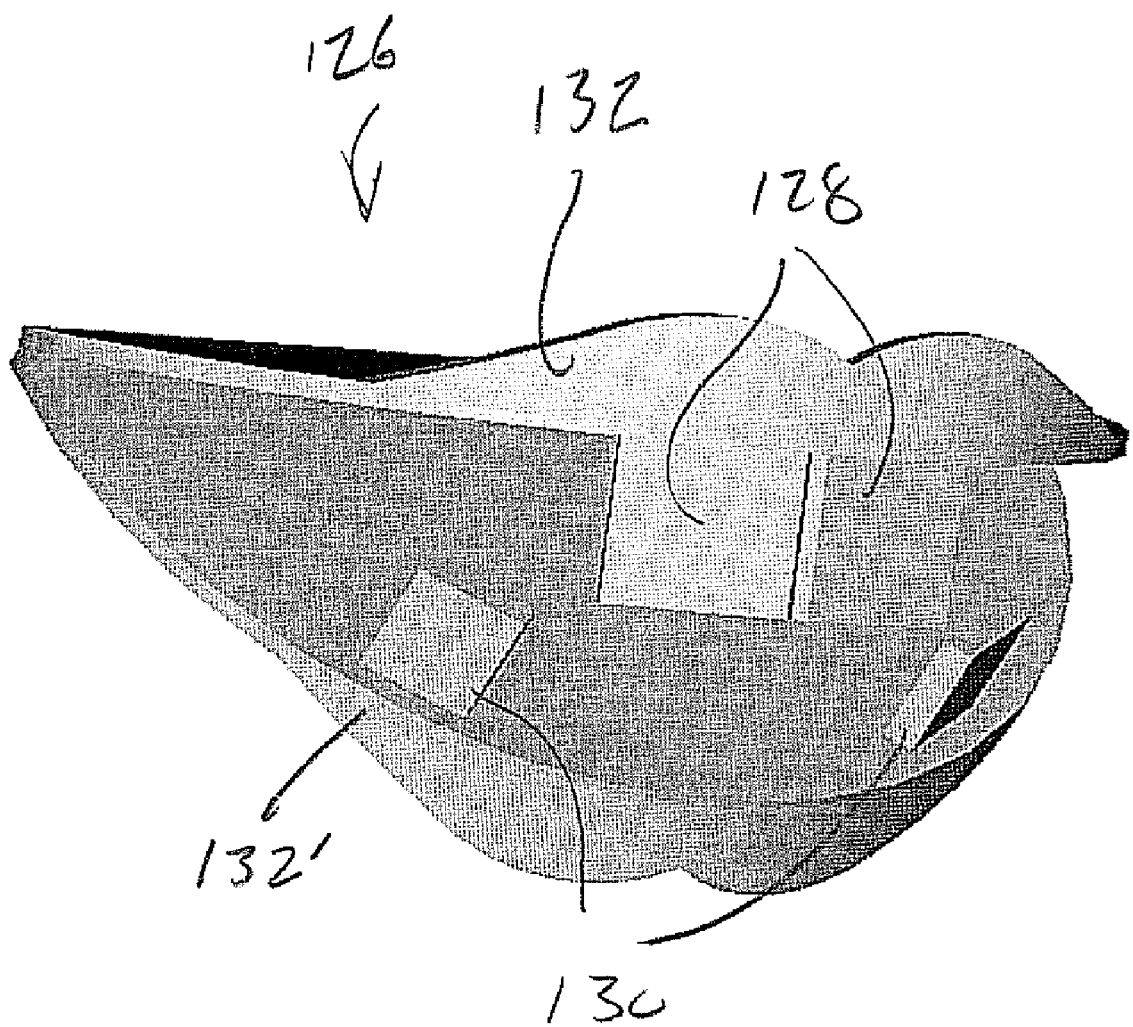
FIG. 15 is a partial perspective illustration of a further version of projectile component according to the present invention.

Finally, and referencing FIGS. 13-15, a series of front plan (non-actuated) 122, front plan actuated 124 and partial perspective 126 views are shown of a projectile component according to a yet further preferred (mimicking mouth pad) variant of the present invention. According to this sub-design variant of projectile, a plurality of teeth 128 and 130 are associated with respective and hingedly supported pads 132 and 132', these further passing through opposing and aligning holes 134 and 134', respectively (see FIG. 13), and in this fashion to permit the pads to actuate to a completely closed position. Additional to the selected features of the projectile component design illustrated in FIGS. 13-15, it is understood that other operable features, such as including the collar, release plate, springs and hinged interconnections are also provided and such as which may be drawn from any of the individual variants previously described.

According to yet additional variants, the pads may further be constructed of a perforated foil, plasticized or other suitable material and which, upon being triggered, allows the pads to be rotated together without creation of a significant wind force or the like, and which would otherwise act to dispel the insect from between the clasping pads. The pads may further evidence sticky or tactile engaging surfaces, this further acting to grip the insect being restrained. In one additional variant, this could contemplate the utilization of a projectile arrangement and which further shows the provision of an inner coil spring disposed within the gun. Additionally, a pair of extended and biased wire portions, can separate upon actuating of the projectile trigger (e.g. by the removal of a wire ring supported on the biased portions and actuated by the tautened lanyard) to clamshell activate the pads to the closed position.

Having described my invention, other and additional preferred embodiments will become apparent to those skilled in the art to which it pertains, and without deviating from the scope of the appended claims. In particular, other and additional firing mechanisms, not limited to spring loading, can be employed in the actuation and propelling of the projectile portion. These may include such as pressurized air, carbon dioxide activated discharge, or even an ignitable powder based discharge of the projectile stem Also, the inventions contemplate capture of any object, animate or inanimate, and which may further be associated with such as a projectile game or other application.

Other and additional modifications to the projectile are also contemplated which would increase the effectiveness of grasping and capturing an insect. These may include designing differently configured or additional pad engagement elements, such as which may be formed into a rose petal like arrangement or other design for optimizing airborne insect capture.

I claim:

1. A toy device for use in entrapping an object, comprising:
   a handheld implement including at least a barrel which supports a propelling mechanism and a trigger which, upon depressing, actuates said propelling mechanism;
   a projectile further comprising a stem supported upon said barrel and in contact with said propelling mechanism, said projectile including at least one displaceable pad being actuated from a first position to a second rotated position, and following being propelled from said implement barrel, to entrap the object;
   said at least on displaceable pad comprises a pair of opposing pads which are each hingedly supported to a stem mounted in crosswise fashion relative to said pads, a collar extending from said stem and being supported upon said barrel;
   a release plate contained within said projectile and biasingly engaging locations associated with said pads to retain said pads in said first position; and
   a lanyard extending from said handheld implement and engaging said release plate and, upon discharging said projectile and tautening said lanyard, said release plate being retracted to cause said pads to displace together.

2. The device as described in claim 1, further comprising at least one spring for influencing said pads toward said second rotated position.

3. The device as described in claim 1, each of said pads exhibiting a specified shape and size and further comprising a substantially semi-circular shaped and grate-like appearance.

4. The device as described in claim 1, said propelling mechanism further comprising a compressible coil spring.

5. The device as described in claim 1, said pads each further comprising an outer frame defining therebetween a three-dimensional cage entrapment portion.

6. The device as described in claim 1, each of said pads further comprising a plurality of teeth are associated with respective and hingedly supported opposed locations, said teeth passing through opposing and aligning holes to permit the pads to actuate to a completely closed position.

7. The device as described in claim 1, said handheld implement further comprising a secondary catapult mechanism supported upon a top surface of said barrel and including an affixed base from which extends an elongated and deflectable neck, said neck being reverse bent in a substantially hairpin style and terminating at a remote end in a bucket support portion, the same being restrained by an opposing and overlapping edge of a likewise deflectable catch portion.

8. The device as described in claim 1, said handheld implement further comprising a barrel upon which a length of said lanyard may be stored in wound fashion upon a pair of winding portions.

9. A toy device for use in entrapping an object, comprising:
   a handheld implement including at least a barrel which supports a propelling mechanism including at least a coil spring and a trigger which, upon depressing, actuates said propelling mechanism;
   a projectile further comprising a stem supported upon said barrel and in contact with said propelling mechanism, said projectile said projectile further comprising a pair of opposing pads which are each hingedly supported to said stem mounted in crosswise fashion relative to said pads, a collar extending from said stem and being supported upon said barrel;
   said pads being displaceable from a first position to a second rotated position, and following being propelled from said implement barrel, to entrap the object;
   a release plate contained within said projectile and biasingly engaging locations associated with said pads to retain said pads in said first position; and
   a lanyard extending from said handheld implement and engaging said release plate and, upon discharging said projectile and tautening said lanyard, said release plate being retracted to cause said pads to displace together.

10. The device as described in claim 9, said pads each further comprising an outer frame defining therebetween a three-dimensional cage entrapment portion.

11. The device as described in claim 9, each of said pads further comprising a plurality of teeth are associated with respective and hingedly supported opposed locations, said teeth passing through opposing and aligning holes to permit the pads to actuate to a completely closed position.

12. The device as described in claim 9, said handheld implement further comprising a secondary catapult mechanism supported upon a top surface of said barrel and including an affixed base from which extends an elongated and deflectable neck, said neck being reverse bent in a substantially hairpin style and terminating at a remote end in a bucket support portion, the same being restrained by an opposing and overlapping edge of a likewise deflectable catch portion.

13. The device as described in claim 9, said handheld implement further comprising a barrel upon which a length of said lanyard may be stored in wound fashion upon a pair of winding portions.

\* \* \* \* \*